United States Patent [19]

Morrison et al.

[11] Patent Number: 5,151,129
[45] Date of Patent: Sep. 29, 1992

[54] PROCESS FOR THE PRODUCTION OF PIGMENTS IN THE PRESENCE OF AN AZO DYESTUFF

[75] Inventors: Donald J. Morrison; David McGregor, both of Glasgow; James M. McCrae, Stewarton, all of Scotland

[73] Assignee: Ciba-Geigy Corporation, Ardsley, N.Y.

[21] Appl. No.: 676,402

[22] Filed: Mar. 28, 1991

[30] Foreign Application Priority Data

Mar. 31, 1990 [GB] United Kingdom ............... 9007284

[51] Int. Cl.$^5$ .......................... C09B 39/00
[52] U.S. Cl. .............................. 106/623; 106/493; 106/22; 106/496; 534/558; 534/573; 534/581; 534/582
[58] Field of Search ........... 106/496, 22, 23, 493; 534/558, 573, 581, 582

[56] References Cited

U.S. PATENT DOCUMENTS

| | | | |
|---|---|---|---|
| 2,237,768 | 4/1941 | Scudi | 260/195 |
| 3,759,733 | 9/1973 | Bradley | 106/309 |
| 3,776,749 | 12/1973 | McKay et al. | 106/288 |
| 4,968,352 | 11/1990 | Keys et al. | 106/494 |

FOREIGN PATENT DOCUMENTS

| 1356253 | 6/1974 | United Kingdom . |
|---|---|---|
| 1356254 | 6/1974 | United Kingdom . |
| 2129434 | 5/1984 | United Kingdom . |

*Primary Examiner*—William R. Dixon, Jr.
*Assistant Examiner*—Scott L. Hertzog
*Attorney, Agent, or Firm*—JoAnn Villamizar

[57] ABSTRACT

A process for the production of a pigment composition comprising precipitating a pigment coupling component from alkaline solution by adding to it an acid, in the presence of a pre-formed, water-soluble azo dyestuff; and subsequently coupling the precipitated coupling component, containing the azo dyestuff, with a pigment diazo or tetrazo component, ensuring that at no time is any substantial amount of uncoupled diazo or tetrazo component present, to form a pigment composition containing the water-soluble azo dyestuff.

23 Claims, No Drawings

PROCESS FOR THE PRODUCTION OF PIGMENTS IN THE PRESENCE OF AN AZO DYESTUFF

The present invention relates to a process for the production or organic pigments, in particular to the production of pigments in the presence of dyestuffs, for use in inks, paints and plastics, but more specifically in inks.

In British Patent Specification No. 1356253, a process is described for producing a diarylide pigment composition by coupling, in water, a tetrazotised pigment benzidine derivative such as 3,3'-dichlorobenzidine, with a pigment coupling component; and incorporating into the pigment so obtained, while the pigment is still in the water, a water-soluble azo dyestuff. Similarly, in British Patent Specification No. 1356254, a process is described for producing an arylamide yellow, arylamide red or beta-naphthol red pigment composition by coupling, in water, a diazotised pigment aniline with a pigment acetoacetarylamide, beta-naphthol or 2-hydroxynaphthalene-3-carboxylic acid arylamide coupling component; and incorporating into the pigment so obtained, while the pigment is still in the water, a water-soluble azo dyestuff.

This process has been used to manufacture commercial pigments having excellent colour strength and transparency in printing inks, when incorporated by conventional milling techniques, such as high energy beadmills, which are required to achieve the desired level of dispersibility and fine particle size of the pigment composition in the applicational medium. Alternatively, conventional "flush" products can be used where such dispersion equipment is not necessary due to the pre-dispersed nature of the flush, e.g. a high-speed mixer can be used, optionally followed by a light or "potting" pass on a triple roll mill.

While the flush process gives products having advantages of ease of incorporation and good dispersibility, it is disadvantageous in certain respects. For example, the pigment content of the flush is rather low (around 20-40% by weight), limiting the formulation flexibility of the user, and the requirement to use specified resins and solvents potentially limits the broad spectrum customer compatibility, since many ink makers use their own specific individual resins when producing their respective inks.

We have now found surprisingly, that by adopting a specific procedure for incorporating an azo dyestuff into a pigment, pigment compositions can be obtained which enable easy incorporation in terms of dispersibility, exhibit fine particle size and other desirable properties similar to those obtained from the flushing process, while avoiding the above-mentioned disadvantages and the need to use high energy mills to produce acceptable inks.

Accordingly, the present invention provides a process for the production of a pigment composition, comprising precipitating a pigment coupling component from alkaline solution by adding to it an acid, in the presence of a pre-formed water-soluble azo dyestuff; and then coupling the precipitated coupling component containing the azo dyestuff with a pigment diazo or tetrazo component, ensuring that at no time is any substantial amount of uncoupled diazo or tetrazo compound present, to form a pigment composition containing the water-soluble azo dyestuff.

The incorporation of the pre-formed azo dyestuff during the precipitation of the pigment coupling component, can be effected by any convenient technique. For example, an aqueous alkaline solution of the pigment coupling component may be added to an aqueous solution containing the pre-formed azo dyestuff and an acid, which may be a mineral acid such as hydrochloric acid, but which is preferably an organic acid, especially a $C_1$-$C_4$ alkanoic acid. Acetic acid is particularly preferred. A mixture of acids may also be used. This method of coupling component precipitation is the preferred method.

If desired, an aqueous alkaline solution of the coupling component and the pre-formed azo dyestuff may be added to an aqueous solution of acid or mixture of acids; or an aqueous solution of the acid or a mixture of acids may be added to an aqueous alkaline solution of the coupling component and the pre-formed azo dyestuff; an aqueous solution of the pre-formed azo dyestuff in the acid or in a mixture of acids may be added to an aqueous alkaline solution of the coupling component.

During the step of precipitating the pigment coupling component from alkaline solution, in the presence of the pre-formed azo dyestuff, the pH value of the precipitation mixture is held in the acid range, preferably in the pH range of from 5 to 6.5. During the step of coupling the pigment coupling component/azo dyestuff mixture with the pigment diazo or tetrazo component, the pH value of the coupling reaction mixture is preferably allowed to drop to 3.5 to 5.5, especially to 4.0 to 5.0, while avoiding the presence of excess uncoupled diazo or tetrazo compound.

In each of the various embodiments for re-precipitating the coupling component from alkaline solution with an acid, in the presence of an azo dye, the resulting precipitated coupling component/azo dye composition is obtained for example in a different physical form relative to that obtained in the absence of dyestuff.

The pigment which is to be treated with an azo dyestuff according to the process of the present invention may be any azo pigment, for example an arylamide yellow pigment, a beta-naphthol red pigment, an arylamide red pigment or an azo metal salt pigment, in particular a diarylide pigment.

Examples of arylamide yellow pigments which may be produced according to the invention include: Pigment Yellow 1 (Yellow G) C.I. No. 11680, produced by coupling acetoacetanilide onto 4-methyl-2-nitroaniline, Pigment Yellow 4 (Yellow 5G) C.I. No. 11665, produced by coupling acetoacetanilide onto 4-nitroaniline; and Pigment Yellow 3 (Yellow 10G) C.I. No. 11710, produced by coupling acetoacet-o-chloroanilide onto 4-chloro-2-nitroaniline.

An example of a beta-naphthol red is Pigment Red 3, C.I. No. 12120, produced by coupling 2-naphthol onto 4-methyl-2-nitroaniline.

Examples of arylamide reds are Pigment Red 9, C.I. No. 12460, produced by coupling 2-methoxyanilide of 3-carboxy-2-hydroxynaphthalene onto 2,5-dichloroaniline; Pigment Red 7, C.I. No. 12420, produced by coupling 4-chloro-2-methylanilide of 3-carboxy-2-hydroxynaphthalene onto 4-chloro-2-methylaniline and Pigment Red 12, C.I. 12385, produced by coupling 2-methylanilide of 3-carboxy-2-hydroxynaphthalene onto 2-methyl-4-nitroaniline.

Preferred diarylide pigments are diarylide orange pigments, diarylide red pigments, diarylide blue pigments, and in particular diarylide yellow pigments.

Examples of diarylide orange pigments include Pigment Orange 13, C.I. No. 21110, produced by coupling 3-methyl-1-phenyl-5-pyrazolone onto 3,3'-dichlorobenzidine; Pigment Orange 34, C.I. No. 21115, produced by coupling 3-methyl-1-p-tolyl-5-pyrazolone onto 3,3'-dichlorobenzidine; and Pigment Yellow 12, C.I. No. 21090, produced by coupling acetoacetanilide onto 3,3'-dimethoxybenzidine.

Examples of the preferred diarylide yellows are Pigment Yellow 12, C.I. No. 21090, produced by coupling acetoacetanilide onto 3,3'-dichlorobenzidine, Pigment Yellow 13, C.I. No. 21100, produced by coupling acetoacet-m-xylidide onto 3,3'-dichlorobenzidine, Pigment Yellow 14, C.I. No. 21095, produced by coupling acetoacet-o-toluidide onto 3,3'-dichlorobenzidine; Pigment Yellow 17, C.I. No. 21105, produced by coupling acetoacet-o-anisidide onto 3,3'-dichlorobenzidine; and Pigment Yellow 83, C.I. No. 21108, produced by coupling acetoacet-4-chloro-2,5-dimethoxyanilide onto 3,3'-dichlorobenzidine; and mixtures of diarylide yellow pigments thereof, e.g. Pigment Yellow 174.

The pre-formed dyestuff used in the process of the invention may be any azo dye, e.g. a monoazo or in particular a biazo dyestuff. The dyestuff may be rendered water-soluble by the inclusion in its molecule, of any water-solubilising group, but carboxylic acid and, especially, sulphonic acid groups, are particularly convenient water-solubilising groups. The water-solubilising groups may be present in the free acid form, or as salts with e.g. alkali metal, alkaline earth metal, ammonium ($NH_4^+$) or amine salts.

Examples of monoazo dyes which may be used are those having the formula I:

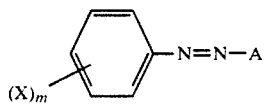

(I)

wherein A represents a residue of either formula II or formula III:

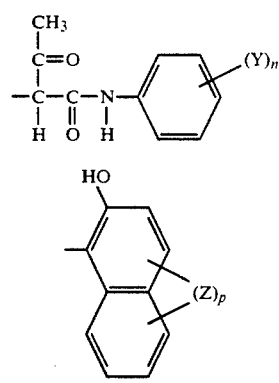

X, Y and Z are the same or different and each is H, $CO_2H$, $SO_3H$, Cl, Br, $NO_2$, $NH_2$, alkyl, aryl, alkyloxy or aryloxy provided that at least one substituent X, Y or Z is $CO_2H$ or $SO_3H$; and m, n and p are the same or different and each is 1, 2, 3, 4 or 5. When m, n or p are greater than or equal to 2, then individual substituents X, Y and Z may be the same or different.

Specific examples of monoazo dyes of formula I are those obtained by coupling acetoacetanilide onto aniline-p-sulphonic acid, o-nitroaniline-p-sulphonic acid, aniline-p-carboxylic acid, o-chloroaniline-p-carboxylic acid; or by coupling acetoacet-p-sulphoanilide onto aniline, p-nitroaniline or o-chloroaniline; or by coupling 2-naphthol onto aniline-p-sulphonic acid.

Examples of bisazo dyes which may be used are those having the formula IV:

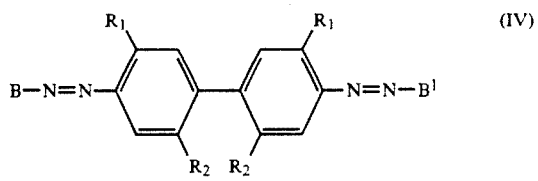

wherein B and $B^1$ are the same or different and each is a residue of formula II or formula V:

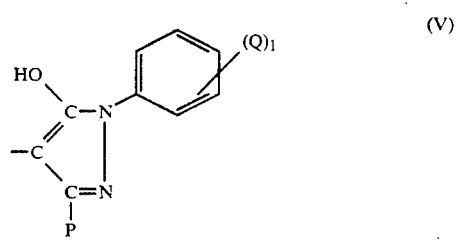

wherein P and Q have the meanings set forth above for X, Y and Z, and l has the meaning set forth above for m, n and p. In formula IV, either both $R_1$ are H and both $R_2$ are $SO_3H$ or $CO_2H$; or both $R_1$ are Cl, $CH_3O$ or $C_1$-$C_4$ alkyl and both $R_2$ are H; provided that at least one $SO_3H$ or $CO_2H$ substituent is present in the bisazo dyestuff of formula IV; or $R_1$ and $R_2$ are the same and each is $SO_3H$ or $CO_2H$.

Further examples of bisazo dyestuffs which may be used are those having the formula VI:

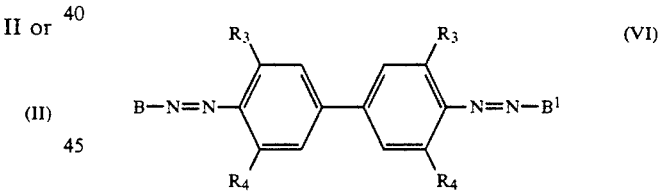

in which $R_3$ and $R_4$, independently, are Cl, $CH_3O$, $C_1$-$C_4$ alkyl, $SO_3H$, $CO_2H$, provided that at least one $SO_3H$ or $CO_2H$ group is present.

Specific examples of bisazo dyes of formula IV, include those obtained by coupling acetoacetanilide, acetoacet-m-xylidide, acetoacet-o-toluidide, acetoacet-p-toluidide, acetoacet-o-anisidide, acetoacet-o-chloroanilide, 3-methyl-1-phenyl-5-pyrazolone or 3-methyl-1-p-tolyl-5-pyrazolone onto 4,4'-diamino-2,2'-biphenyl disulphonic acid; and those obtained by coupling acetoacet-p-sulphoanilide onto 3,3'-dichlorobenzidine or onto 3,3'-dimethoxybenzidine.

The amount of the pre-formed azo dye used in the process of the present invention may vary within a wide range. Preferably an amount of azo dye ranging from 0.1 to 25%, especially from 0.5 to 10% by weight is used, based on the weight of the total pigment composition produced in the process.

The azo dye used may be a single compound, or may be a mixture of two or more different azo compounds.

The azo dye used may be of the same chemical type as the pigment, or it may be of a different chemical type. Thus, for example, a monoazo dye may be used to treat a bisazo pigment, or a bisazo dye may be used to treat a monoazo pigment. Normally and preferably however, the azo dye and the azo pigment will be of similar type and shade. Most preferably a pre-formed diarylide dye is used to treat a diarylide pigment.

Various co-additives may be incorporated into the pigment compositions produced according to the present invention, either individually or as mixtures thereof. Examples of such co-additives, which are used normally in a total amount of from 1 to 50% by weight of the total pigment composition, include surfactants, resins and long chain fatty acids and amines. Surfactants used may be of the anionic type, such as fatty acid taurides, fatty acid N-methyltaurides, fatty acid isothionates, alkylbenzenesulphonates, alkylnaphthalenesulfonates, alkyl-phenol polyglycol ether sulphates and fatty alcohol polyglycol ether sulphates; fatty acids, such as palmitic, stearic and oleic acids; soaps, such as alkali metal salts of fatty acids and naphthenic acids; cationic surfactants include quaternary ammonium salts, and N-oxides of tertiary amines or salts thereof; non-ionic surfactants include fatty alcohol polyglycol ethers (ethoxylated fatty alcohols), fatty acid polyglycol esters, alkylphenol polyglycol ethers and dialkyl polyglycol ethers. Resins include wood rosin, hydrogenated wood rosin, and polyamide resins e.g. those produced by condensing phthalic anhydride with long chain amines. Amines which may be added include long chain primary amines e.g. stearyl amine; amine derivatives of wood rosin; N-long chain alkylalkylene diamines; polyamines; beta-amines, polyamide/polyamine derivatives of ethoxylated fatty amines and diamines, and derivatives of these compounds.

Relative to conventional methods of producing azo pigments treated with an azo dyestuff, the process of the present invention provides the following advantages:

1. The time required for the coupling of the coupling component and the diazo or tetrazo component is greatly reduced, and is typically halved;

2. In many instances the pigment product quality is significantly improved in terms of its ease of incorporation, dispersibility and fine particle size in applicational media. For example, a useable ink can be produced by use of a high-speed stirrer, optionally followed by a light dispersion pass on a triple roll mill, the ink quality being characterised in having substantially no particles greater than 20 microns in size compared to conventionally prepared material which produces inks with significant numbers of such particles when prepared under similar conditions;

3. The pigment product manufactured by the process of the invention, when incorporated into applicational media, is similar in quality to that produced when conventional flush products are incorporated by similar techniques, and yet special resins and solvents which are essential to flushing procedures are not required.

The invention is further illustrated by the following Examples. All parts are by weight unless otherwise stated.

EXAMPLE 1

Solution (I): Tetrazo 3,3'-dichlorobenzidine is prepared by tetrazotising 19.2 parts of 3,3'-dichlorobenzidine in 300 parts of water at 0° C. Solution (II): 23.5 parts of acetoacet-m-xylidide and 9.3 parts of acetoacet-o-toluidide are dissolved in a solution of 7.5 parts of sodium hydroxide in 200 parts of water. Solution (III): 1.2 parts of dyestuff prepared by coupling tetrazotised 4,4'-diamino-2,2'-biphenyl disulphonic acid with acetoacet-m-xylidide are dissolved in 80 parts of water at 80° C.

Solution (III) is added to a coupling vessel containing 600 parts of water. The pH of the diluted solution (III) is adjusted to 2.5 with dilute acetic acid. Solution (II) is then added to the coupling vessel over the course of 5 minutes. The pH of the contents of the coupling vessel is adjusted to 6.0 0with either dilute acetic acid or dilute sodium hydroxide, as required. Solution (I) is run into the coupling vessel at ambient temperature ensuring that at no time any substantial quantity of uncoupled tetrazo compound present. The pH of the mixture is allowed to drop to 4.9/5.1 and controlled at this pH as necessary by addition of 10% sodium hydroxide solution. The pH of the pigment slurry so obtained is raised to 6.0 by addition of 10% sodium hydroxide solution. 25.6 parts of the disproportionated gum rosin sold under the trade mark "Recoldis A Resin", dissolved in a solution of 3.5 parts of sodium hydroxide in 300 parts of water at 90° C. are added to the pigment slurry. The slurry is heated to 90°/95° C. and a solution of 3.4 parts of zinc sulphate monohydrate in 50 parts of water is added over 2 minutes. The pH is adjusted to 6.0 with dilute hydrochloric acid and the slurry is stirred for 1 hour at 90°/95° C. Pigment is then filtered off, washed with water and dried at 60° C.

An ink premix is formed by dispersing 30 parts of pigment so obtained in 105 parts of heatset varnish and 15 parts of aliphatic distillate having a boiling point of 260°-290° C. by stirring at 9,000 rpm for 10 minutes at 70° C. on a high speed stirrer. The ink premix is mixed by hand with further heatset varnish and distillate to give an ink containing 14.6 parts of pigment composition for 100 parts of ink. The ink so prepared is given one light dispersion pass on a three roll mill.

The dispersibility of the pigment is visually assessed under a microscope at the premix stage and after three roll mill treatment. Strength development is assessed between premix and three roll mill stages. The results are shown in Table 1.

The composition of the varnish used is as follows: 1000 parts Sparkle 51 ®, a rosin-modified phenolic; 2000 parts Thermogel K5 ®, a rosin modified phenolic and 660 parts of linseed oil acid, refined.

COMPARATIVE EXAMPLE 1

A pigment powder is prepared by using the procedure described in Example 1, except that the dyestuff solution (III) is added at the end of the coupling reaction after pH adjustment to 6.0 and before resin addition. This procedure of adding dyestuff is the conventional practice adopted in the pigment industry. The pigment product is made into an ink as described in Example 1 and evaluated similarly (see Table 1).

EXAMPLE 2

A pigment powder is prepared by using the procedure described in Example 1 except that the dyestuff solution (III) is added to the acetoacet-m-xylidide/acetoacet-o-toluidide solution (II) and this mixture is run into a coupling vessel containing 600 parts of water adjusted to pH 2.5 using acetic acid. The pigment powder is made into an ink as described in Example 1 and evaluated similarly (see Table 1).

EXAMPLE 3

A pigment powder is prepared using the procedure described in Example 1, except that the dyestuff weight is reduced by 50%. The pigment is made into an ink and evaluated as outlined in Example 1 (see Table 1).

COMPARATIVE EXAMPLE 2

A pigment powder is prepared using the procedure described in Example 3 except that the dyestuff solution (III) is added at the end of the coupling reaction, after pH adjustment to 6.0 and before addition of resin solution, viz using conventional practice. The pigment is made into an ink and evaluated as in Example 1 (see Table 1).

EXAMPLE 4

A pigment powder is prepared using the procedure described in Example 1 except that the dyestuff solution (III) and the coupling component solution (II) are mixed and added to a coupling vessel containing only 600 parts of water. Dilute acetic acid is then slowly added to the coupling vessel until the pH drops to 6.0. The pigment powder is made into an ink as described in Example 1 and evaluated similarly (see Table 1).

COMPARATIVE EXAMPLE 3

A pigment powder is prepared using the procedure described in Example 4 except that the dyestuff solution (III) is added at the end of the coupling reaction after pH adjustment to 6.0 and before addition of resin solution, as per conventional practice. The pigment is made into an ink and evaluated as in Example 1 (see Table 1).

EXAMPLE 5

A pigment powder is prepared using the procedure described in Example 1 except that no solution of zinc sulphate monohydrate is added and the final pH of the pigment slurry is adjusted to 3.0 with dilute hydrochloric acid instead of 6.0. The pigment powder is made into an ink and evaluated as in Example 1 (see Table 1).

EXAMPLE 6

Example 1 is repeated except that the water-soluble azo dyestuff, prepared by coupling tetrazo 3,3'-dichlorobenzidine with acetoacet-p-sulphoanilide, replaces the dyestuff prepared by coupling tetrazo 4,4'-diamino-2,2'-biphenyl disulphonic acid with acetoacet-m-xylidide. The pigment product is made into an ink and evaluated as in Example 1 (see Table 1).

EXAMPLE 7

Example 1 is repeated except that the water-soluble azo dyestuff, prepared by coupling tetrazo 4,4'-diamino-2,2'-biphenyl disulphonic acid with acetoacet-m-xylidide and 3-methyl-1-phenyl-5-pyrazolone, replaces the dyestuff prepared by coupling tetrazo 4,4'-diamino-2,2'-biphenyl disulphonic acid with acetoacet-m-xylidide. The pigment product is made into an ink and evaluated as in Example 1 (see Table 1).

EXAMPLE 8

Solution (I): Tetrazo 3,3'-dichlorobenzidine is prepared by tetrazotising 38.3 parts of 3,3'-dichlorobenzidine in 300 parts of water at 0° C. Solution (II): 63.5 parts of acetoacet-m-xylidide are dissolved in a solution of 12 parts of sodium hydroxide in 400 parts of water. Solution (III): 1.8 parts of dyestuff prepared by coupling tetrazotised 4,4'-diamino-2,2'-biphenyl disulphonic acid with acetoacet-m-xylidide are dissolved in 100 parts of water at 80° C.

Solution (III) is added to a coupling vessel containing 800 parts of water. The pH of the diluted solution (III) is adjusted to 2.5 with dilute acetic acid.

Solution (II) is then added to the coupling vessel over the course of 5 minutes. The pH of the contents of the coupling vessel is adjusted to 6.0 0with either dilute acetic acid or dilute sodium hydroxide, as required. Solution (I) is run into the coupling vessel at ambient temperature ensuring that at no time any substantial quantity of uncoupled tetrazo compound present. The pH of the mixture is allowed to drop to 4.6/4.7 and controlled at this pH as necessary, by addition of 10% sodium hydroxide solution. The pH of the pigment slurry so obtained is raised to 6.0 by addition of 10% sodium hydroxide solution. 46.5 parts of the resin, based on hydrogenated abietic acid sold under the Trade Mark "Staybelite Resin", dissolved in a solution of 6 parts of sodium hydroxide in 400 parts of water at 90° C., are added to the pigment slurry. The slurry is boiled and the pH of the slurry is adjusted to 5.0 with dilute hydrochloric acid solution. The slurry is boiled for 1 hour. The pigment product is then filtered off, washed with water and dried at 60° C. The pigment powder is made into an ink and evaluated as in Example 1 (see Table 1).

COMPARATIVE EXAMPLE 4

A pigment powder is prepared using the procedure described in Example 8 except that the dyestuff solution (III) is added at the end of the coupling reaction after pH adjustment to 6.0 and before addition of resin solution viz using conventional practice. The pigment is made into an ink and evaluated as in Example 1 (see Table 1).

EXAMPLE 9

Solution (I): Tetrazo 3,3'-dichlorobenzidine is prepared by tetrazotising 57.6 parts of 3,3'-dichlorobenzidine in 580 parts of water at 0° C. Solution (II): 84.0 parts of 3-methyl-1-phenyl-5-pyrazolone and 0.3 parts of 3-carboethoxy-1-phenyl-5-pyrazolone are dissolved in a solution of 19.7 parts of sodium hydroxide in 900 parts of water. Solution (III): 0.7 parts of dyestuff prepared by coupling tetrazotised 3,3'-dichlorobenzidine with 3-methyl-1-(4-sulphophenyl)-5-pyrazolone, are dissolved in 70 parts of water at 70° C.

Solution (III) is added to a coupling vessel containing 30.0 parts of glacial acetic acid in 1600 parts of water. Solution (II) is then added to the coupling vessel over the course of 5 minutes to give a suspension of pH 6.6. The pH of the contents of the coupling vessel is lowered to 6.0 with dilute acetic acid and the temperature is lowered to 10° C. with ice. Solution (I) is run into the coupling vessel over 20 minutes while the temperature is maintained at 10° C., ensuring that at no time is any substantial quantity of uncouplet tetrazo compound present.

After coupling, the pH of the pigment slurry is raised from 1.8 to 6.0 using 10% aqueous sodium hydroxide. 67.0 parts of the disproportionated gum rosin solt under the trade mark "Recoldis A Resin", dissolved in a solution of 6.6 parts of sodium hydroxide in 600 parts of water at 90° C. are added to the pigment slurry. The slurry is heated to 95° C. whereupon a solution of 8.2 parts of zinc sulphate monohydrate in 150 parts of water is added over 2 minutes. The pH is adjusted to 6.0 with dilute hydrochloric acid and the slurry is stirred for 30 minutes at 95° C. The pigment product is isolated by filtration washed salt-free with water, and oven-dried at 65° C. Ink prepared from the pigment product using the procedure outlined in Example 1 exhibits superior dispersibility to ink prepared from pigment manufactured by the conventional method of dyestuff treatment, viz Comparative Example 5.

COMPARATIVE EXAMPLE 5

A pigment product is prepared by using the procedure outlined in Example 9 except that the dyestuff solution (III) is added at the end of the coupling reaction, after pH adjustment to 6.0 and before resin addition. As in Example 9, tetrazo solution (I) is added to the precipitated coupling component over 20 minutes. However, a total of 2 hours are required for complete reaction of the tetrazotised 3,3'-dichlorobenzidine, compared to only 20 minutes for coupling component precipitated in the presence of dyestuff, viz Example 9.

TABLE 1

| Example | Coupling Rate | Premix Dispersion | Final Dispersion | Particles above 20 Microns in Premix Ink | Strength Development |
|---|---|---|---|---|---|
| 1 | fast | excellent | good | none | good |
| C.1 | slow | very poor | good | many | poor |
| 2 | fast | excellent | good | none | good |
| 3 | fast | excellent | good | none | good |
| C.2 | slow | very poor | good | many | poor |
| 4 | fast | excellent | good | none | good |
| C.3 | slow | very poor | good | many | poor |
| 5 | fast | excellent | good | none | good |
| 6 | fast | excellent | good | none | good |
| 7 | fast | excellent | good | none | poor |
| 8 | fast | excellent | good | none | good |
| C.4 | slow | poor | acceptable | many | poor |

Key

Coupling Rate

Fast = faster than normal; slow = normal rate of coupling i.e. coupling in the absence of dyestuff.

Dispersion

Rating: excellent, good, acceptable, poor and very poor.
Conventional dyestuff treated pigments, when incorporated into ink media, for example heatset systems, as described in Example 1, do not usually yield useable inks after premixing. These inks are generally characterised by:
(i) very poor or poor premix dispersion with many particles greater than 20 microns;
(ii) acceptable or good final dispersion.
Pigments manufactured by the process of the invention usually yield useable inks after premixing when incorporated as outlined in Example 1. These inks are generally characterised by:
(i) excellent premix dispersion with substantially no particles greater than 20 microns;
(ii) good final dispersion.

Strength Development

Rating: good or poor
The strength development between the premix and final ink stages is rated as poor when conventional dyestuff treated pigments are evaluated as in Example 1.

We claim:

1. A process for the production of a pigment composition comprising precipitating a pigment coupling component from alkaline solution by adding to it an acid, in the presence of a pre-formed, water-soluble azo dyestuff; and subsequently coupling the precipitated coupling component, containing the azo dyestuff, with a pigment diazo or tetrazo component, ensuring that at no time is any substantial amount of uncoupled diazo or tetrazo component present, to form a pigment composition containing the water-soluble azo dyestuff.

2. A process according to claim 1 wherein an aqueous alkaline solution of the pigment coupling component is added to an aqueous solution containing the acid and the pre-formed azo dyestuff.

3. A process according to claim 1 wherein an aqueous alkaline solution of the coupling component and the pre-formed azo dyestuff is added to an aqueous solution of the acid, or mixture of acids.

4. A process according to claim 1 wherein an aqueous solution of the acid or mixture of acids, is added to an aqueous alkaline solution of the coupling component and the pre-formed azo dyestuff.

5. A process according to claim 1 wherein an aqueous solution of the preformed azo dyestuff in the acid or in a mixture of the acid is added to an aqueous alkaline solution of the pigment coupling component.

6. A process according to claim 1 wherein, during the step of precipitating the pigment coupling component from alkaline solution in the presence of preformed azo dyestuff, the pH value of the precipitation mixture is in the range of from 5 to 6.5

7. A process according to claim 1 wherein, during the step of coupling the pigment coupling component/azo dyestuff mixture with the pigment diazo or tetrazo component, the pH value of the coupling reaction mixture is within the range of from 3.5 to 5.5, while avoiding the presence of excess uncoupled diazo or tetrazo compound.

8. A process according to claim 7 wherein the pH value of the coupling reaction mixture is within the range of from 4.0 to 5.0.

9. A process according to claim 1 wherein the pigment is an arylamide yellow pigment, a beta-naphthol red pigment, an arylamide red pigment, an azo metal salt pigment or a diarylide pigment.

10. A process according to claim 9 wherein the pigment is a diarylide yellow pigment.

11. A process according to claim 10 wherein the diarylide yellow pigment is Pigment Yellow 12, Pigment Yellow 13, Pigment Yellow 14, Pigment Yellow 17 or Pigment Yellow 83, or mixtures of these.

12. A process according to claim 1 wherein the azo dyestuff is a mono or bisazo dyestuff.

13. A process according to claim 12 wherein the azo dyestuff is a bisazo dyestuff.

14. A process according to claim 12 wherein the monoazo dyestuff has the formula I:

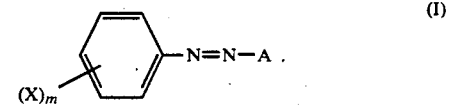

(I)

in which A is a residue of formula II or III:

(II)

-continued

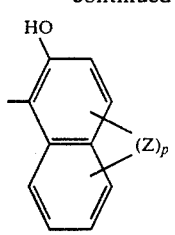
(III)

in which X, Y and Z are the same or different and each is H, CO$_2$H, SO$_3$H, Cl, Br, NO$_2$, NH$_2$, alkyl, aryl, alkoxy or aryloxy provided that at least one of X, Y and Z is CO$_2$H or SO$_3$H; and m, n and p are the same or different and each is 1, 2, 3, 4 or 5; and provided that when m, n or p, respectively, are 2, 3, 4 or 5, then individual substituents X, Y and Z, respectively, may be the same or different.

15. A process according to claim 14 wherein the monoazo dyestuff of formula I is that obtained by coupling acetoacetanilide onto aniline-p-sulphonic acid, o-nitroaniline-p-sulphonic acid, aniline-p-carboxylic acid or o-chloroaniline-p-carboxylic acid; or by coupling acetoacet-p-sulphoanilide onto aniline, p-nitroaniline or o-chloroaniline; or by coupling 2-naphthol onto aniline-p-sulphonic acid.

16. A process according to claim 12 wherein the bisazo dyestuff has the formula IV:

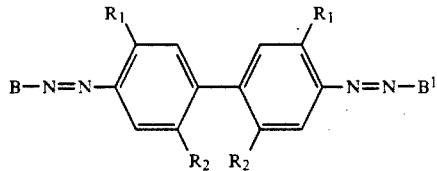
(IV)

wherein B and B$^1$ are the same or different and each is a residue of formula II

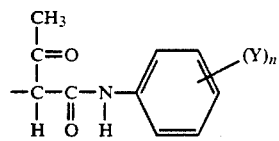
(II)

in which Y is H, CO$_2$H, SO$_3$H, Cl, Br, NO$_2$, NH$_2$, alkyl, aryl, alkoxy or aryloxy and n is 1, 2, 3, 4 or 5 or formula V:

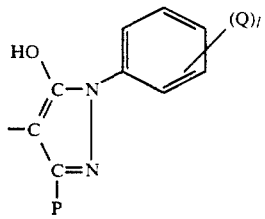
(V)

in which P and Q are the same or different and each is H, CO$_2$H, SO$_3$H, Cl, Br, NO$_2$, NH$_2$, alkyl, aryl, alkoxy or aryloxy; and l is 1, 2, 3 4 or 5 and, when l is 2, 3, 4 or 4 then individual substituents Q may be the same or different; and either both R$_1$ are H and both R$_2$ are SO$_3$H, or both R$_1$ are Cl, CH$_3$O or C$_1$-C$_4$alkyl and both R$_2$ are H; provided that the compound of formula IV contains at least one SO$_3$H or CO$_2$H substituent; or R$_1$ and R$_2$ are the same and each is SO$_3$H or CO$_2$H.

17. A process according to claim 12 wherein the biazo dyestuff has the formula VI:

$$\text{B—N=N—}\underset{R_4}{\overset{R_3}{\underset{|}{\bigcirc}}}\text{—}\underset{R_4}{\overset{R_3}{\underset{|}{\bigcirc}}}\text{—N=N—B}^1 \quad (VI)$$

wherein B and B$^1$ are the same or different and each is a residue of the formula II or V and R$_3$ and R$_4$, independently, are Cl, CH$_3$O, C$_1$-C$_4$alkyl, SO$_3$H or CO$_2$H, provided that the compound of formula VI contains at least one SO$_3$H or CO$_2$H group.

18. A process according to claim 12 wherein the bisazo dyestuff is one obtained by coupling acetoacetanilide, acetoacet-m-xylidide, acetoacet-o-toluidide, acetoacet-p-toluidide, acetoacet-o-anisidide, acetoacet-o-chloroanilide, 3-methyl-1-phenyl-5-pyrazolone or 3-methyl-1-p-tolyl-5-pyrazolone, onto 4,4'-diamino-2,2'-biphenyl disulphonic acid; or one obtained by coupling acetoacet-p-sulphonilide onto 3,3'-dichlorobenzidine or onto 3,3'-dimethoxybenzidine.

19. A process according to claim 1 wherein the amount of azo dyestuff used ranges from 0.1 to 25% by weight, based on the weight of the total pigment composition produced in the process.

20. A process according to claim 19 wherein the amount of azo dyestuff used ranged from 0.5 to 10% by weight, based on the weight of the total pigment composition produced in the process.

21. A process according to claim 1 wherein the azo dyestuff and the azo pigment are of the same chemical type and of the same shade.

22. A paint or plastic containing a pigment prepared by the process according to claim 1.

23. A printing ink containing a pigment prepared by the process according to claim 1.

* * * * *